(12) United States Patent
Pfeiffer et al.

(10) Patent No.: US 10,796,503 B2
(45) Date of Patent: Oct. 6, 2020

(54) VEHICLE CALIBRATION BASED UPON PERFORMANCE PRODUCT DETECTION

(71) Applicant: Ford Global Technologies, LLC, Dearborn, MI (US)

(72) Inventors: John Jeffrey Pfeiffer, Saline, MI (US); Matthew Eric Bushore, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 228 days.

(21) Appl. No.: 15/660,793

(22) Filed: Jul. 26, 2017

(65) Prior Publication Data

US 2019/0035174 A1     Jan. 31, 2019

(51) Int. Cl.
| | |
|---|---|
| *G07C 5/08* | (2006.01) |
| *G07C 5/00* | (2006.01) |
| *F16H 61/00* | (2006.01) |
| *F02B 77/08* | (2006.01) |
| *B60G 17/015* | (2006.01) |

(52) U.S. Cl.
CPC ......... *G07C 5/0808* (2013.01); *B60G 17/015* (2013.01); *F02B 77/083* (2013.01); *F16H 61/00* (2013.01); *G07C 5/0825* (2013.01); *B60G 2800/012* (2013.01); *F16H 2061/0068* (2013.01); *F16H 2342/00* (2013.01); *G07C 5/008* (2013.01)

(58) Field of Classification Search
CPC ... G07C 5/0808; B60G 17/015; F02B 77/083; F16H 61/00

USPC ........................................................... 701/33
See application file for complete search history.

(56) References Cited

U.S. PATENT DOCUMENTS

| | | | |
|---|---|---|---|
| 5,771,480 A | 6/1998 | Yanase | |
| 9,132,839 B1 | 9/2015 | Tan | |
| 9,315,164 B2 | 4/2016 | Grimm et al. | |
| 9,469,259 B2 | 10/2016 | Grimm et al. | |
| 2002/0163449 A1* | 11/2002 | Flick | B60R 25/102 340/988 |
| 2006/0106510 A1* | 5/2006 | Heffington | B60R 16/0231 701/29.6 |
| 2010/0057297 A1* | 3/2010 | Itagaki | B60G 17/0182 701/38 |
| 2010/0268422 A1* | 10/2010 | Blommer | B62D 5/0472 701/44 |

(Continued)

FOREIGN PATENT DOCUMENTS

CN              104354659 A      2/2015

*Primary Examiner* — Khoi H Tran
*Assistant Examiner* — Rodney P King
(74) *Attorney, Agent, or Firm* — Frank Lollo; Eversheds Sutherland (US) LLP (57) ABSTRACT

Method and apparatus are disclosed for vehicle calibration based upon performance product detection. An example vehicle includes a receiver to receive a wireless signal from a transducer of an performance product that includes characteristics of the performance product. The example vehicle also includes a product controller to authenticate the performance product based upon the wireless signal and send, upon authentication, a calibration instruction that includes the characteristics. The example vehicle also includes an electronic control unit to receive the calibration instruction and adjust a calibration to a target setting based upon the characteristics.

20 Claims, 4 Drawing Sheets

(56) References Cited

U.S. PATENT DOCUMENTS

| | | | | |
|---|---|---|---|---|
| 2010/0268423 | A1* | 10/2010 | Breed | B60N 2/002 701/45 |
| 2012/0186560 | A1* | 7/2012 | Lund | F02D 19/0642 123/495 |
| 2012/0191291 | A1* | 7/2012 | Krause | G07C 5/008 701/29.6 |
| 2013/0073169 | A1* | 3/2013 | Emberson | F02D 28/00 701/99 |
| 2013/0197753 | A1* | 8/2013 | Daly | H04B 1/082 701/36 |
| 2013/0282231 | A1* | 10/2013 | Farr | G06F 7/00 701/34.4 |
| 2013/0321138 | A1* | 12/2013 | Sakagami | B60C 23/02 340/442 |
| 2014/0067231 | A1* | 3/2014 | Mosher | F02D 28/00 701/102 |
| 2014/0350749 | A1* | 11/2014 | Kwak | B60R 16/0231 701/2 |
| 2016/0001654 | A1* | 1/2016 | Nolte | B60K 23/04 701/69 |
| 2016/0189115 | A1* | 6/2016 | Cattone | G06Q 10/20 705/26.8 |

* cited by examiner

VEHICLE CALIBRATION BASED UPON PERFORMANCE PRODUCT DETECTION

TECHNICAL FIELD

The present disclosure generally relates to vehicle calibration and, more specifically, to vehicle calibration based upon performance product detection.

BACKGROUND

Vehicles typically include a plurality of electronic control units. Generally, each of the electronic control units monitor and control various subsystems throughout the vehicle. For instance, some vehicles include electronic control units to monitor and control an engine, a battery, door functions, human-machine interfaces, suspension, cruise-control, telematics, brakes, seats, etc. The electronic control units may include hardware, firmware, circuits, input devices, and/or output devices to monitor and control the corresponding subsystem.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle calibration based upon performance product detection. An example disclosed vehicle includes a receiver to receive a wireless signal from a transducer of an performance product that includes characteristics of the performance product. The example disclosed vehicle also includes a product controller to authenticate the performance product based upon the wireless signal and send, upon authentication, a calibration instruction that includes the characteristics. The example disclosed vehicle also includes an electronic control unit to receive the calibration instruction and adjust a calibration to a target setting based upon the characteristics.

An example disclosed method for calibrating vehicles includes receiving, via a receiver of a vehicle, a wireless signal from a transducer of an performance product that includes characteristics of the performance product and authenticating, via a processor, the performance product based upon the wireless signal. The example disclosed method also includes sending, upon authentication, a calibration instruction that includes the characteristics to an electronic control unit and adjusting a calibration of the electronic control unit to a target setting based upon the characteristics.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles typically include a plurality of electronic control units. Generally, each of the electronic control units monitor and control various subsystems throughout the vehicle. For instance, some vehicles include electronic control units to monitor and control an engine, a battery, door functions, human-machine interfaces, suspension, cruise-control, telematics, brakes, seats, etc. The electronic control units may include hardware, firmware, circuits, input devices, and/or output devices to monitor and control the corresponding subsystem. In some instances, an user of a vehicle may install an performance product onto the vehicle to affect various aesthetic and/or performance characteristics of the vehicle. The performance product installed onto the vehicle by the user may intentionally or unintentionally affect performance of one or more of the electronic control units that control the various subsystems of the vehicle.

As used herein, a "performance product" refers to a vehicle component (e.g., a part, a piece of equipment, an accessory, a chemical) that is installed onto a vehicle to affect (e.g., improve, customize, etc.) the performance of the vehicle. Example performance products may be sold with the vehicle, produced by an original equipment manufacturer, be approved by the original equipment manufacturer of the vehicle, and/or be manufactured and/or sold by a secondary source without approval of the original equipment manufacturer. Further, example performance products include aftermarket products. As used herein, an "aftermarket product" refers to a vehicle component (e.g., a part, a piece of equipment, an accessory, a chemical) that is installed onto a vehicle after a consumer has purchased the vehicle from an original equipment manufacturer. The aftermarket product may be manufactured and/or sold by the original equipment manufacturer and/or by a secondary source. Example aftermarket products include spark plugs, tires, rims, hoods, kits, spoilers, wings, dampers, anti-sway bars, mufflers, windows, entertainment systems, speakers, seats, etc. As used herein, an "original equipment manufacturer" and an "OEM" refer to a manufacturer that manufactured and/or assembled a vehicle as initially sold to a consumer.

Example apparatus and methods disclosed herein include a performance controller that detect performance products installed onto the vehicle via receivers (e.g., wireless receivers) that receive signals (e.g., wireless signals) transmitted by transducers (e.g., wireless transducers) that are incorporated into the performance products. The product controller determines whether the detected performance products affect performance of electronic control units that operate various components of the vehicle, and the electronic control units adjust calibrations based upon the detected performance products to increase performance of the electronic control units during operation of the vehicle.

For example, a vehicle system disclosed herein detects performance products installed on a vehicle and adjusts vehicle calibrations based on those performance products to increase performance of the vehicle. The vehicle system utilizes wireless systems of the vehicle (e.g., RFID communication, BLE communication, TPMS communication and/or other short-range wireless communication, etc.) to detect performance products. A product controller receives the collected data and provides the collected data to other control modules. An electronic control module (ECU) determines whether calibration alterations are able to be made based on the performance products. If calibrations are able to be made, the electronic control module calibrates settings based on the performance products. For example, a vehicle dynamics module calibrates settings to increase performance of the vehicle based on data related to performance tires, wings, etc. A powertrain control module calibrates settings to increase performance of the vehicle based on data related to changes to cooling calibration, power output, etc. Further, an infotainment unit may present information related to the performance products and the calibrations made by the electronic control modules.

Figure 1:
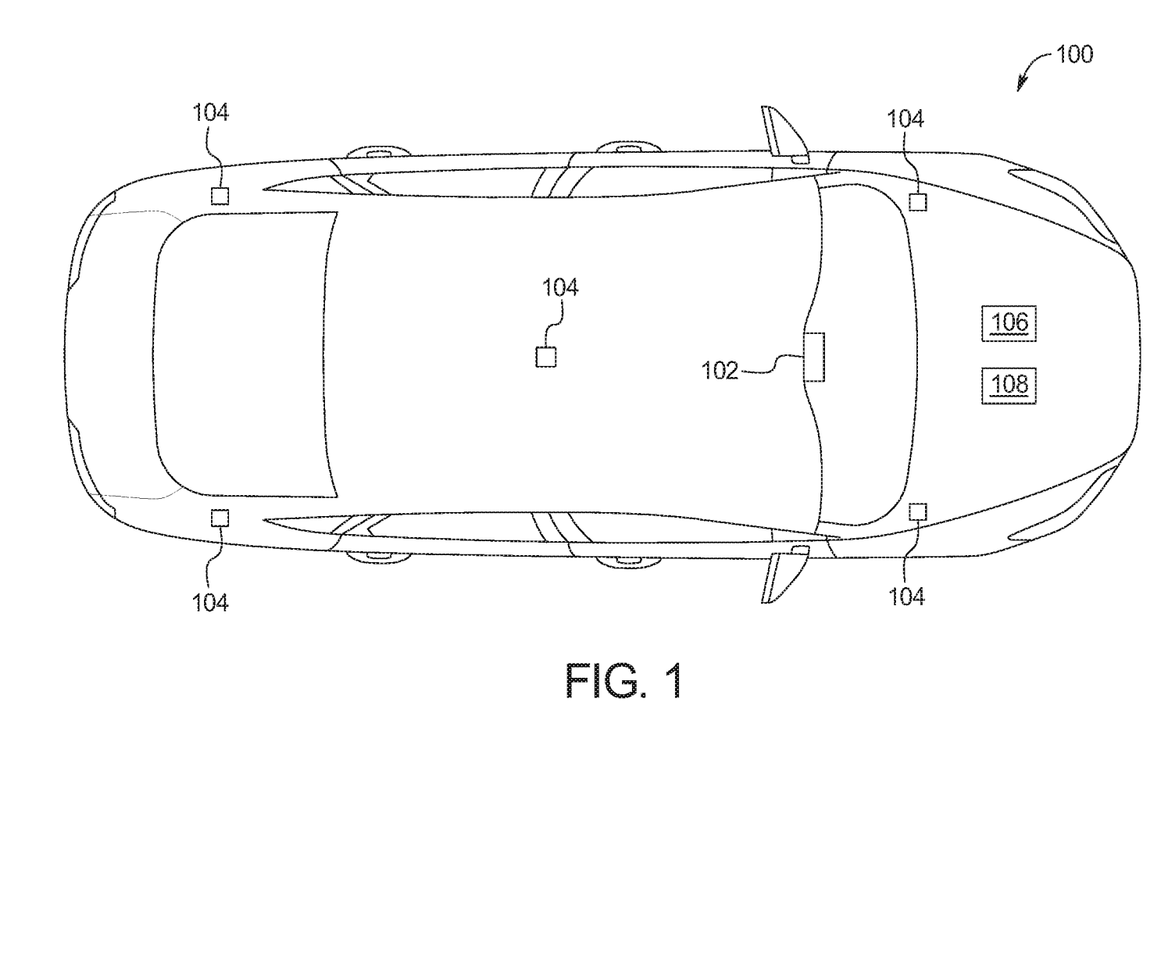
FIG. 1 illustrates an example vehicle in accordance with the teachings herein.

Turning to the figures, FIG. 1 illustrates an example vehicle in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes a display 102, one or more receivers 104, one or more electronic control units (ECUs) 106, and a product controller 108.

The display 102 presents information to an occupant (e.g., a driver, a passenger) of the vehicle 100. For example, the display 102 includes the display 102 a heads-up display and/or a center console display such as a liquid crystal display (LCD), an organic light emitting diode (OLED) display, a flat panel display, a solid state display, etc. In some examples, the display 102 is a touchscreen.

The receivers 104 of the illustrated example include wireless receivers that receive wireless signals. For example, the vehicle 100 includes a plurality of the receivers 104 to increase wireless coverage of the receivers 104 throughout the vehicle 100. The receivers 104 receive wireless signals from wireless transducers of performance products (e.g., transducers 204 of tires 202 of FIG. 2, a transducer 208 of a spoiler 206 of FIG. 2, a transducer 212 of a wing 210 of FIG. 2, a transducer 216 of an anti-sway bar 214 of FIG. 2, a transducer 220 of a spark plug 218 of FIG. 2, transducers 224 of dampers 222 of FIG. 2). The transmitted wireless signals include information corresponding to characteristics of the performance products, for example, to enable the vehicle 100 in identifying the performance products. Manufacturers of the performance products incorporate the wireless transducers into (e.g., couple the wireless transducers to) the performance products to enable the vehicle 100 to identify the performance product that has been installed onto the vehicle 100. Further, in some examples, the receivers 104 include wired receivers that receive signals from wired transducers of performance products. For example, an performance product may incorporate a wired transducer if the performance product includes and/or is to be installed in a shielded components that hinders wireless communication with wireless receivers.

Figure 3:
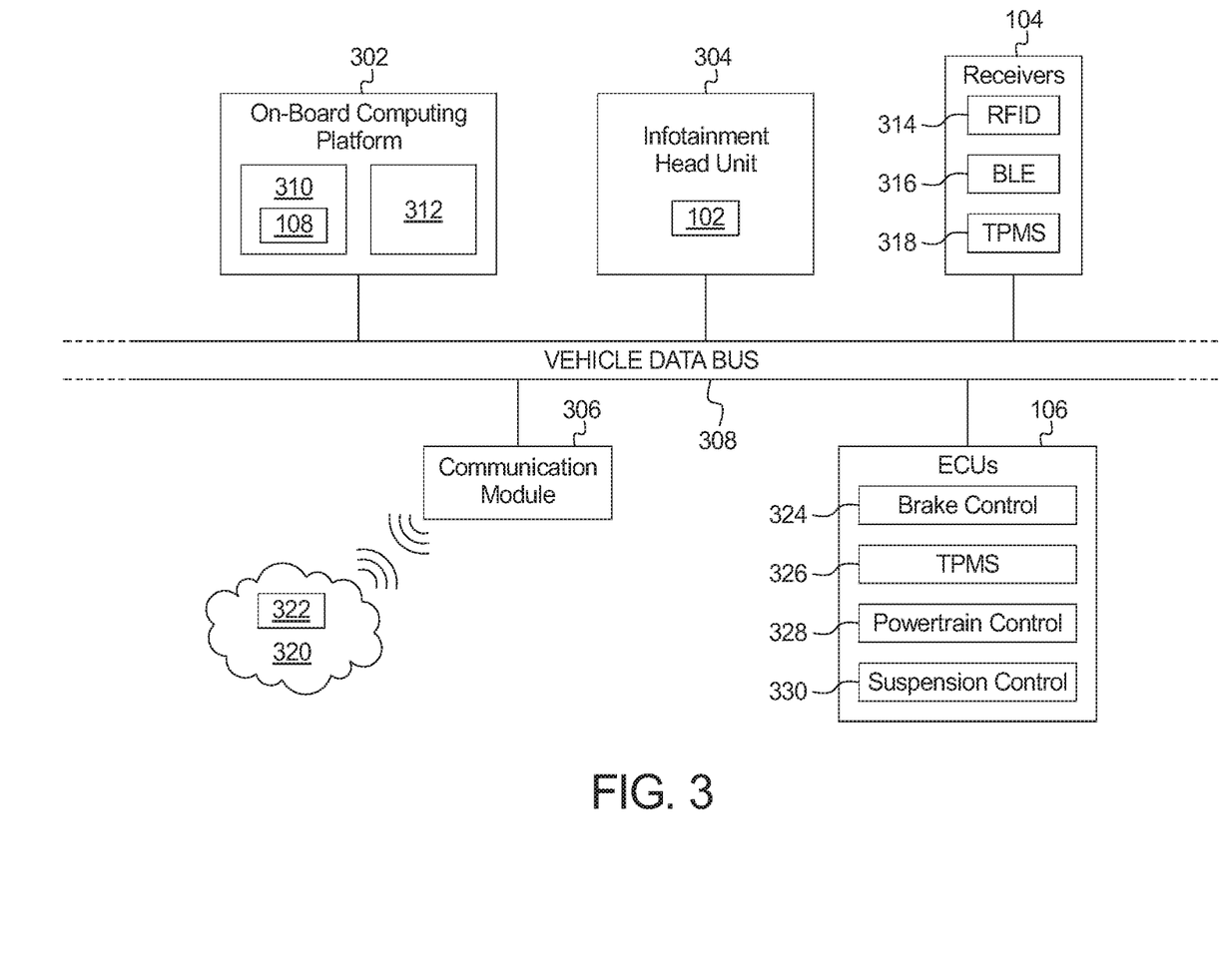
FIG. 3 is a block diagram of electronic components of the vehicle of FIG. 1.

Each of the ECUs 106 (e.g., a brake control module 324 of FIG. 3, a tire-pressure monitoring system (TPMS) control unit 326 of FIG. 3, a powertrain control module 328 of FIG. 3, a suspension control module 330 of FIG. 3, etc.) monitor and control the subsystems of the vehicle 100. For example, the ECUs 106 are discrete sets of electronics that include their own circuit(s) (e.g., integrated circuits, microprocessors, memory, storage, etc.) and firmware, sensors, actuators, and/or mounting hardware. The ECUs 106 communicate and exchange information via a vehicle data bus (e.g., a vehicle data bus 308 of FIG. 3). Additionally, the ECUs 106 may communicate properties (e.g., status of the ECUs 106, sensor readings, control state, error and diagnostic codes, etc.) to and/or receive requests from each other. For example, the vehicle 100 may have seventy or more of the ECUs 106 that are positioned in various locations around the vehicle 100 and are communicatively coupled by the vehicle data bus.

The product controller 108 is communicatively coupled to the receivers 104 to receive the signal(s) of the performance product(s) from one or more of the receivers 104. Based on the signal(s), the product controller 108 detects the performance product(s) that have been installed onto the vehicle 100. The product controller 108 determines which, if any, of the ECUs 106 are affected by characteristics of the performance product(s). Further, if the product controller 108 determines that performance of one or more of the ECUs 106 is affected by the detected performance product(s), the product controller 108 sends calibration instruction(s) to those of the ECUs 106 affected by the performance product(s).

In operation, one or more of the receivers 104 receive signal(s) (e.g., wireless signals) from transducer(s) of performance product(s) that are installed onto the vehicle 100. The product controller 108 receives the signal(s) from the receivers 104 and identifies which, if any, performance product(s) have been installed onto the vehicle 100 based on those signal(s). In some examples, the product controller 108 identifies a product type, a manufacturer, a model number, and/or any other characteristics of the performance product based on the received signal. For example, based on the signal(s), the product controller 108 identifies a product type, a manufacturer, and/or a model number of a performance tire (e.g., an aftermarket tire, one of tires 202 of FIG. 2), a performance spoiler (e.g., an aftermarket spoiler, a spoiler 206 of FIG. 2), a performance wing (e.g., an aftermarket wing, a wing 210 of FIG. 2), a performance anti-sway bar (e.g., an aftermarket anti-sway bar, an anti-sway bar 214 of FIG. 2), a performance spark plug (e.g., an aftermarket spark plug, a spark plug 218 of FIG. 2), a performance damper (e.g., an aftermarket damper, one of dampers 222 of FIG. 2), a performance hood (e.g., an aftermarket hood, a hood 226 of FIG. 2), and/or any other performance and/or aftermarket product that has been installed onto the vehicle 100.

Upon identifying an performance product, the product controller 108 determines, based upon the received signal(s), whether the performance product is authenticated to be installed onto the vehicle 100. For example, if an performance product installed onto the vehicle 100 is not authenticated by an OEM of the vehicle 100, the OEM may void a warranty of the vehicle and/or a component of the vehicle 100 and/or may prevent vehicle calibrations from being adjusted based on the non-authenticated performance product. Upon authenticating an performance product, the product controller 108 determines whether the performance product affects performance of any of the ECUs 106 based upon characteristics of the performance product. For example, the characteristics of the performance product are included in the signal received by one or more of the receivers 104 and/or are retrieved by the product controller 108 (e.g. from a server 322 of FIG. 3) upon identifying the performance product based on the signal. In some examples, the display 102 presents information corresponding to the characteristics of the detected performance product(s) to occupant(s) of the vehicle 100.

Upon determining that the performance product affects performance of one or more of the ECUs 106, the product controller 108 sends calibration instructions to those of the ECUs 106 that are affected by the performance product. The calibration instructions include the characteristics of the performance product to enable the ECUs 106 to adjust calibrations based on the performance product. Further, in some examples, the product controller 108 checks for updated software for those of the ECUs 106 affected by the performance product based on the characteristics of the performance product. If the product controller 108 identifies updated software for one or more of the ECUs 106, the product controller 108 sends the updated software to the corresponding one(s) of the ECUs 106.

Further, those of the ECUs 106 that are affected by the performance product receive the calibration instruction(s) from the product controller 108. The one or more of the ECUs 106 that receive calibration instruction(s) adjust one or more calibrations based on the characteristics of the performance product. For example, one of the ECUs 106 determines a target setting for a calibration based upon a current setting and/or the characteristics of the performance product and adjusts the calibration to the target setting. In some examples, the display 102 presents information corresponding to adjusted calibration(s) of one or more of the ECUs 106 to occupant(s) of the vehicle 100.

Figure 2:
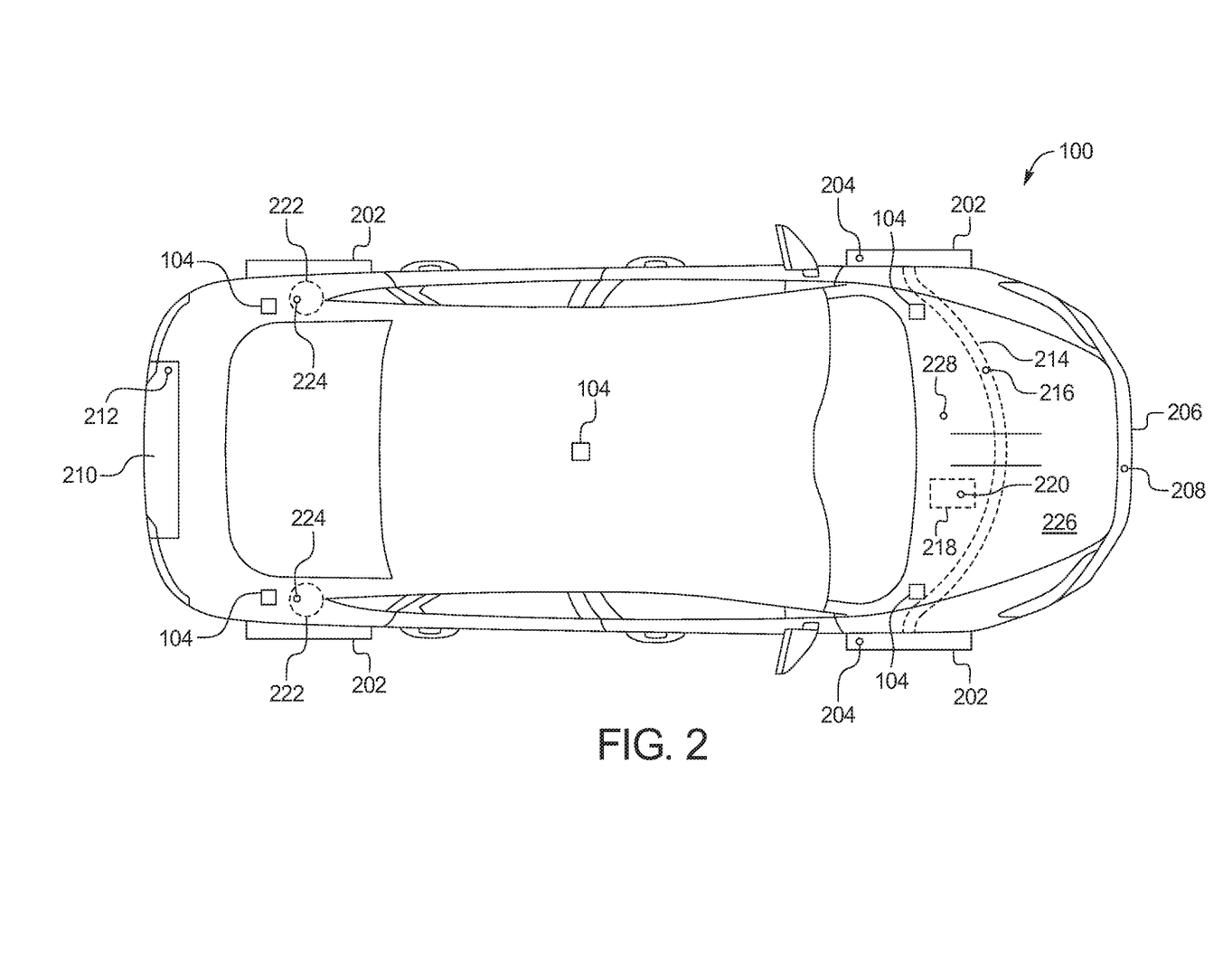
FIG. 2 illustrates receivers receiving wireless signals from performance products of the vehicle of FIG. 1.

FIG. 2 illustrates the receivers 104 of the vehicle 100 receiving wireless signals from performance products coupled to and/or incorporated within the vehicle 100 to enable detection of those performance products.

The vehicle 100 of the illustrated example includes tires 202. In the illustrated example, the tires 202 at a front of the vehicle 100 are performance products that include transducers 204 (e.g., wireless transducers). Additionally or alternatively, one or more of the tires 202 at a rear of the vehicle 100 are performance products and/or one or more of the tires 202 at the front of the vehicle 100 are not performance products. The transducers 204 of the tires 202 that are performance products transmit wireless signals that are received by one or more of the receivers 104 to enable the product controller 108 to detect and identify those of the tires 202 that are performance products.

The vehicle 100 of the illustrated example also includes a spoiler 206 that is an performance product. The spoiler 206 includes a transducer 208 (e.g., a wireless transducer) that transmits a wireless signal to be received by one or more of the receivers 104 to enable the product controller 108 to detect and identify the spoiler 206 as an performance product. The vehicle 100 also includes a wing 210 that is an performance product. The wing 210 includes a transducer 212 (e.g., a wireless transducer) that transmits a wireless signal to be received by one or more of the receivers 104 to enable the product controller 108 to detect and identify the wing 210 as an performance product. The vehicle 100 also includes an anti-sway bar 214 that is an performance product. The anti-sway bar 214 includes a transducer 216 (e.g., a wireless transducer) that transmits a wireless signal to be received by one or more of the receivers 104 to enable the product controller 108 to detect and identify the anti-sway bar 214 as an performance product. The vehicle 100 also includes a spark plug 218 that is an performance product. The spark plug 218 includes a transducer 220 (e.g., a wireless transducer) that transmits a wireless signal to be received by one or more of the receivers 104 to enable the product controller 108 to detect and identify the spark plug 218 as an performance product.

As illustrated in FIG. 2, the vehicle 100 also includes dampers 222 (e.g., suspension dampers) at the rear of the vehicle 100 that are performance products. The dampers 222 include transducers 224 (e.g., wireless transducers) that transmit wireless signals. Those wireless signals are to be received by one or more of the receivers 104 to enable the product controller 108 to detect and identify the dampers 222 as performance products. Additionally or alternatively, other suspension dampers of the vehicle 100 may be performance products that includes transducers for the identification of the performance products. Additionally, the vehicle 100 of the illustrated example includes a hood 226 that is an performance product. The hood 226 includes a transducer 228 (e.g., a wireless transducer) that transmits a wireless signal to be received by one or more of the receivers 104 to enable the product controller 108 to detect and identify the hood 226 as an performance product.

In some examples, one or more of the receivers 104 are RFID readers (e.g., an RFID reader 314 of FIG. 3) and the transducers of the performance products are RFID tags to enable detection and identification of the performance products via radio-frequency identification (RFID). In some such examples, an RFID tag of an performance product is an active RFID tag. In other such examples, an RFID tag of an performance product is a passive RFID tag such that the performance product does not include a battery and/or other energy source for the RFID tag.

Further, in some examples, one or more of the receivers 104 are wireless transceivers that are capable of both receiving and sending wireless signals. For example, one or more of the receivers 104 and/or one or more of the transducers of the performance products are short-range wireless modules that each include hardware and firmware to establish communication with each other. In some such examples, the short-range wireless modules are BLE modules (e.g., a BLE module 316 of FIG. 3) that implement Bluetooth® Low Energy (BLE) protocols, which are set forth in Volume 6 of the Bluetooth Specification 4.0 (and subsequent revisions) maintained by the Bluetooth Special Interest Group. In other such examples, the short-range wireless modules are tire-pressure monitoring system (TPMS) modules (e.g., a TPMS module 318 of FIG. 3) that are located near wheel wells of the vehicle 100.

FIG. 3 is a block diagram of electronic components 300 of the vehicle of FIG. 1. As illustrated in FIG. 3, the electronic components 300 include an on-board computing platform 302, an infotainment head unit 304, the receivers 104, a communication module 306, the ECUs 106, and a vehicle data bus 308.

The on-board computing platform 302 includes a microcontroller unit, controller or processor 310 and memory 312. In some examples, the processor 310 of the on-board computing platform 302 is structured to include the product controller 108. Alternatively, in some examples, the product controller 108 is incorporated into another electronic control unit (ECU) with its own processor 310 and memory 312. The processor 310 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 312 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 312 includes multiple kinds of memory, particularly volatile memory and non-volatile memory.

The memory 312 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 312, the computer readable medium, and/or within the processor 310 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 304 provides an interface between the vehicle 100 and a user. The infotainment head unit 304 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, the display 102 (e.g., a heads-up display, a center console display such as a liquid crystal display (LCD), an organic light emitting diode (OLED) display, a flat panel display, a solid state display, etc.), and/or speakers. In the illustrated example, the infotainment head unit 304 includes hardware (e.g., a processor or controller, memory, storage, etc.) and software (e.g., an operating system, etc.) for an infotainment system (e.g., SYNC® and MyFord Touch® by Ford®, etc.). Additionally, the infotainment head unit 304 displays the infotainment system on, for example, the display 102.

The receivers 104 include an RFID reader 314, a BLE module 316, and a TPMS module 318. The RFID reader 314 of the vehicle 100 is capable of receiving a signal for identifying an performance product when a transducer of the performance product is an RFID tag. The BLE module 316 is capable of receiving a signal for identifying an performance product when a transducer of the performance product is another BLE module. Further, the TPMS module 318 is capable of receiving a signal for identifying an performance product when a transducer of the performance product is TPMS transducer.

The communication module 306 includes wired or wireless network interfaces to enable communication with external networks. The communication module 306 also includes hardware (e.g., processors, memory, storage, antenna, etc.) and software to control the wired or wireless network interfaces. In the illustrated example, the communication module 306 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m), Wireless Gigabit (IEEE 802.11ad), etc.). As illustrated in FIG. 3, the communication module 306 wirelessly communicates with a network 320.

The network 320 of the illustrated example may be a public network, such as the Internet; a private network, such as an intranet; or combinations thereof, and may utilize a variety of networking protocols now available or later developed including, but not limited to, TCP/IP-based networking protocols. As illustrated in FIG. 3, the network 320 includes a server 322. In some examples, the server 322 stores information of known performance products. When the product controller 108 identifies an performance product based on a signal received by one or more of the receivers 104, the product controller 108 may collect additional information and/or characteristics of the identified performance product from the server 322 via the communication module 306. Additionally or alternatively, the server 322 may collect, store, analyze, and/or communicate purchase history information of an user of the vehicle 100. In some such examples, the product controller retrieves the purchase history information from the server 322 via the communication module 306 and determines when the user has purchased an performance product for installation onto the vehicle 100 based on the purchase history information. In other such examples, the server 322 identifies when the user has purchased an performance product for the vehicle 100 based on the purchase history information and communicates characteristics of the performance product to the product controller 108.

As illustrated in FIG. 3, the ECUs 106 of the vehicle 100 include a brake control module 324, a tire-pressure monitoring system (TPMS) control unit 326, a powertrain control module 328, and a suspension control module 330.

The brake control module 324 (e.g., an anti-lock braking system (ABS) module) controls braking of the vehicle 100, for example, to prevent wheels of the vehicle 100 from locking (i.e., stopping rotation) and/or to prevent uncontrolled skidding during braking. In some examples, the brake control module 324 adjusts a calibration corresponding to a front-brake line-lock function, a stability control tuning, and/or a slip threshold for anti-lock brakes based upon characteristics of the tires 202 that are performance products. For example, if the tires 202 that are performance products are winter or snow tires, the brake control module 324 is to disable the front-brake line-lock function.

The TPMS control unit 326 monitors an air pressure within a tire and triggers an alert if the air pressure within the tire is below a predetermined threshold. In some examples, the TPMS control unit 326 adjusts a calibration corresponding to an air pressure threshold based upon characteristics of the tires 202 that are performance products. For example, the TPMS control unit 326 is to increase or decrease the air pressure threshold based upon the recommended air pressure for the tires 202 that are performance products.

The powertrain control module 328 controls operation of an engine and a transmission of the vehicle 100. For example, the powertrain control module 328 includes an engine control unit, a transmission control unit, and/or a throttle control unit. The powertrain control module 328 is to adjust calibration(s) based on the spark plug 218, the tires 202, the hood 226, the spoiler 206, the wing 210, and/or any other performance product that is installed onto the vehicle 100.

For example, the powertrain control module 328 is to adjust tuning calibrations of the engine based upon the spark plug 218. The powertrain control module 328 also is to adjust launch control calibrations, a speed rating for a maximum velocity, and/or throttle calibrations based upon characteristics of the tires 202 that include compounds and/or architectures of the tires 202. Additionally or alternatively, the powertrain control module 328 is to adjust a calibration for a ratio applied to a rate of rotation of a drive shaft to determine a vehicle speed based upon characteristics of the tires 202 that include an outer diameter of the tires 202. The powertrain control module 328 also is to adjust engine a cooling factor calibration (e.g., delay an engine heat protection mode) based upon characteristics of an airflow flowing to the engine that are caused by the hood 226.

Further, in some examples, the powertrain control module 328 is to adjust calibrations based upon the spoiler 206 and/or the wing 210. For example, the powertrain control module 328 is to adjust a calibration for a ratio applied to a pedal angle to determine a throttle of the engine based upon characteristics of the spoiler 206 and/or the wing 210 that correspond to a drag caused by the spoiler 206 and/or the wing 210 (e.g., the spoiler 206 reduces the drag, the wing 210 increases the drag). Additionally or alternatively, the powertrain control module 328 is to adjust a calibration for the sensitivity of the pedal angle based upon characteristics related to a tire rolling resistance, a final drive ratio, a trailer load, etc. Further, in some examples, the powertrain control module 328 is to adjust a speed rating for a maximum velocity, a torque vectoring factor, and/or an all-wheel drive torque split based upon characteristics of the spoiler 206 and/or the wing 210.

The suspension control module 330 controls operation of suspension of the vehicle 100. For example, the suspension control module 330 controls operation of the anti-sway bar 214 and/or the dampers 222 and adjust calibrations based upon characteristics of the anti-sway bar 214 and/or the dampers 222. In some examples, the suspension control module 330 is to adjust a stability control setting and/or an advanced track setting based upon or a roll stiffness to affect a vehicle reaction and/or an allowable yaw angle while turning the vehicle 100 along a corner (i.e., cornering).

The vehicle data bus 308 communicatively couples the receivers 104, the ECUs 106, the on-board computing platform 302, the infotainment head unit 304, and the communication module 306. In some examples, the vehicle data bus 308 includes one or more data buses. The vehicle data bus 308 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
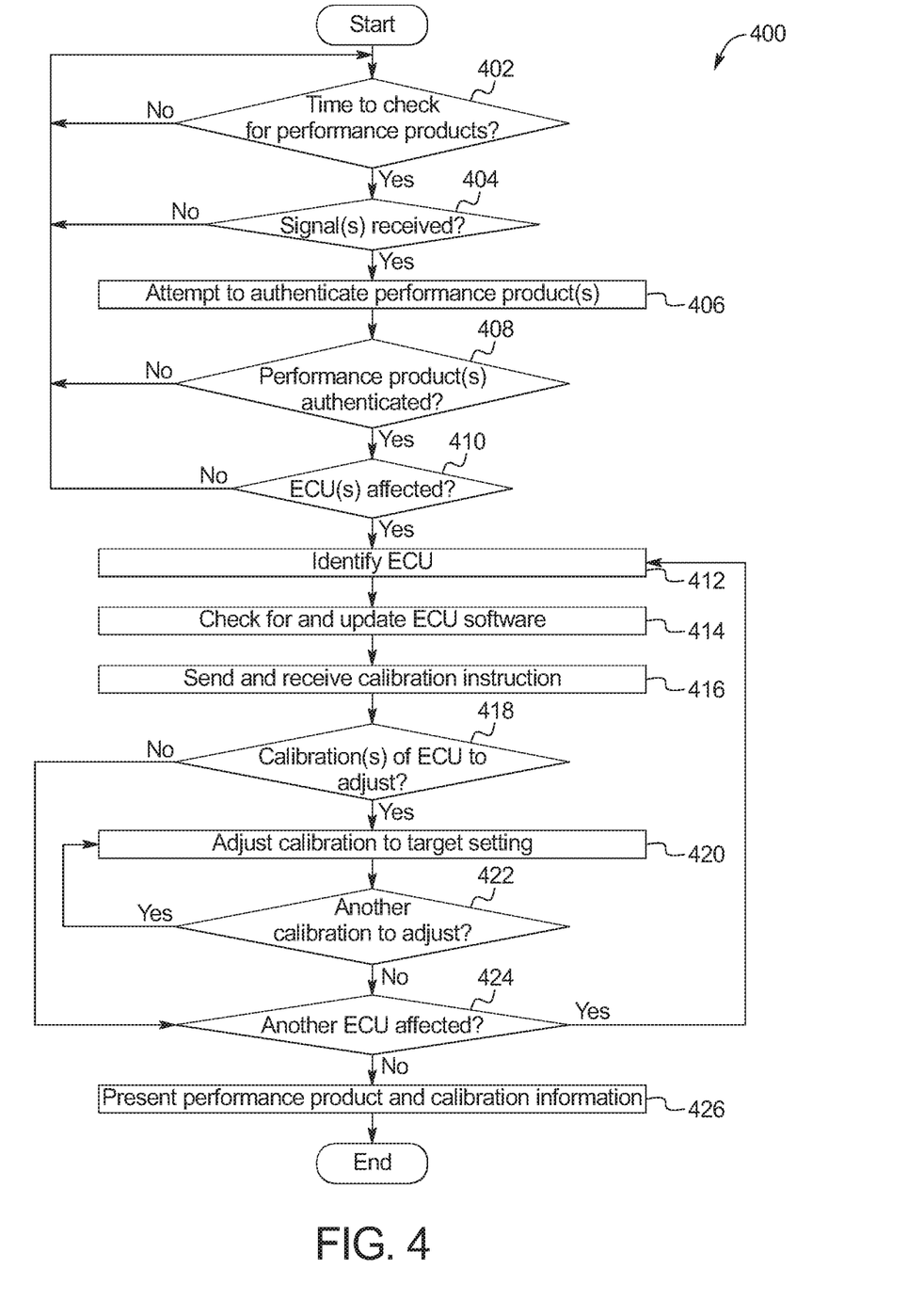
FIG. 4 is a flowchart for detecting performance products and calibrating electronic control modules of the vehicle of FIG. 1 in accordance with the teachings herein.

FIG. 4 is a flowchart of an example method 400 to detect performance products and calibrate electronic control modules of a vehicle in accordance with the teachings herein. The flowchart of FIG. 4 is representative of machine readable instructions that are stored in memory (such as the memory 312 of FIG. 3) and include one or more programs which, when executed by a processor (such as the processor 310 of FIG. 3), cause the vehicle 100 to implement the example product controller 108 of FIGS. 1 and 3. While the example program is described with reference to the flowchart illustrated in FIG. 4, many other methods of implementing the example product controller 108 may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below.

Initially, at block 402, the product controller 108 determines whether it is time to check for performance products installed on the vehicle 100. For example, the product controller is to check for performance products each time the vehicle 100 is activated for operation. Additionally or alternatively, the product controller 108 is scheduled to check for performance products at regular intervals (e.g., once an hour, once a day, once a week, etc.). In response to the product controller 108 determining that it is not time to check for performance products, the method 400 remains at block 402. Otherwise, in response to the product controller 108 determining that it is not time to check for performance products, the method 400 proceeds to block 404.

At block 404, the product controller 108 determines whether one or more of the receivers 104 have received signal(s) transmitted by transducer(s) of performance product(s). In response to the product controller 108 determining that none of the receivers 104 have received a signal from a transducer of an performance product, the method returns to block 402. Otherwise, in response to the product controller 108 determining that one or more of the receivers 104 has received signal(s) from transducer(s) of performance product(s), the method 400 proceeds to block 406.

At block 406, the product controller 108 attempts to authenticate performance product(s) identified by the product controller 108. For example, prior to attempting to authenticate the performance product(s), the product controller 108 receives the signal(s) from the receivers 104 and identifies the performance product(s) based on the received signal(s). At block 408, the product controller 108 determines whether the product controller 108 was able to authenticate one or more of the performance product(s) corresponding to the received signals. In response to the product controller 108 determining that none of the performance product(s) were authenticated, the method returns to block 402. Otherwise, in response to the product controller 108 determining that at least one of the identified performance product(s) was authenticated, the method 400 proceeds to block 410 upon the product controller 108 identifying which of the performance product(s) were authenticated.

At block 410, the product controller 108 determines whether performance of any of the ECUs 106 are affected by the authenticated performance product(s). In response to the product controller 108 determining that none of the ECUs 106 are affected by the performance product(s), the method 400 returns to block 402. Otherwise, in response to the product controller 108 determining that one or more of the ECUs 106 are affected by the performance product(s), the method 400 proceeds to block 412.

At block 412, the product controller 108 identifies or selects one of the ECUs 106 that is affected by one or more of the performance product(s) installed onto the vehicle 100. At block 414, the product controller 108 checks for updated software for the selected one of the ECUs 106 and, if there is updated software, sends the updated software to the selected one of the ECUs 106 for installation. At block 416, the product controller 108 sends and the selected one of the ECUs 106 receives a calibration instruction.

At block 418, the selected one of the ECUs 106 determines whether there is a calibration to adjust based on the installation of the performance product(s). For example, the selected one of the ECUs 106 identifies a calibration that it controls, identifies a current setting of the calibration, determines a target setting of the calibration based on the characteristics of the performance product(s), compares the current setting and the target setting, and determines whether to adjust the calibration based upon the comparison. In response to the selected one of the ECUs 106 determining that the calibration is to be adjusted, the method 400 proceeds to block 420 at which the selected one of the ECUs 106 adjusts the calibration to the target setting. At block 422, the selected one of the ECUs 106 determines whether there is another calibration to adjust based on the performance product(s). In response to the selected one of the ECUs 106 determining that there is another calibration to adjust, the method returns to block 420 at which the selected one of the ECUs 106 adjusts the other calibration.

Otherwise, in response to the selected one of the ECUs 106 determining at block 418 or block 422 that there is not a calibration to adjust, the product controller 108 determines whether there is another one of the ECUs 106 that is affected by the performance product(s) installed onto the vehicle 100. In response to the product controller 108 determining that another one of the ECUs 106 is affected, the method returns to block 412. Otherwise, in response to the product controller 108 determining that another one of the ECUs 106 is not affected, the method 400 proceeds to block 426 at which the display 102 and/or another output device of the vehicle 100 presents information related to the detected performance product(s) and/or the adjusted calibration(s) of the ECUs 106.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities, often in conjunction with sensors. A "module" and an "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a receiver configured to receive a wireless signal from a transducer of a performance product, the wireless signal including a characteristic of the performance product and a product type of the performance product;
a product controller configured to:
determine, based upon the characteristic and the product type included in the wireless signal, that the performance product is authenticated to be installed on the vehicle;
determine that the performance product affects performance of an electronic control unit of the vehicle based upon the characteristic and the product type of the performance product; and
send, based on the determination that the performance product is authenticated to be installed on the vehicle and the determination that the performance product affects the electronic control unit, to the electronic control unit a calibration instruction to perform a calibration of the electronic control unit based on the characteristic and the product type; and
the electronic control unit configured to:
receive the calibration instruction; and
adjust a calibration of the electronic control unit to a target setting based upon the calibration instruction.

2. The vehicle of claim 1, wherein the receiver includes a short-range wireless module or an RFID reader, and wherein the performance product includes an aftermarket product.

3. The vehicle of claim 2, wherein the product controller detects the aftermarket product in response to the receiver receiving the wireless signal from the transducer of the aftermarket product.

4. The vehicle of claim 1, further including a display in communication with the product controller that presents information corresponding to the characteristic of the performance product and the calibration of the electronic control unit.

5. The vehicle of claim 1, wherein, prior to sending the calibration instruction to the electronic control unit, the product controller checks for updated software of the electronic control unit based upon the characteristic of the performance product.

6. The vehicle of claim 1, wherein the electronic control unit further adjusts the setting to the target setting based upon a current setting of the calibration.

7. The vehicle of claim 1, wherein, based upon the wireless signal received by the receiver, the product controller determines that the product type of the performance product includes a tire.

8. The vehicle of claim 7, wherein the electronic control unit includes a powertrain control module, the characteristic includes a tire size including an outer diameter of the tire, and the calibration includes a ratio applied to a rate of rotation of a drive shaft to determine a vehicle speed, the ratio being adjusted by the powertrain control module based upon the outer diameter.

9. The vehicle of claim 1, wherein, based upon the wireless signal received by the receiver, the product controller determines that the product type of the performance product includes at least one of a spoiler and a wing.

10. The vehicle of claim 9, wherein the electronic control unit includes a powertrain control module, the characteristic includes a drag caused by the at least one of the spoiler and the wing, and the calibration includes a speed rating for a maximum velocity, the speed rating being adjusted by the powertrain control module based upon the drag.

11. The vehicle of claim 1, wherein, based upon the wireless signal received by the receiver, the product controller determines that the product type of the performance product includes a hood.

12. The vehicle of claim 11, wherein the electronic control unit includes a powertrain control module, the characteristic includes an airflow to an engine caused by the hood, and the calibration includes a cooling factor for the engine that is adjusted by the powertrain control module based upon the airflow.

13. The vehicle of claim 1, wherein, based upon the wireless signal received by the receiver, the product controller determines that the product type of the performance product includes at least one of an anti-sway bar and a damper.

14. The vehicle of claim 13, the electronic control unit includes a suspension control module, the characteristic includes a roll stiffness corresponding to the anti-sway bar and the damper, and the calibration includes a stability control setting that is adjusted by the suspension control module based upon the roll stiffness.

15. The vehicle of claim 1, further comprising:
a second electronic control unit,
wherein the product controller is further configured to:
determine that the performance product affects performance of the second electronic control unit; and
send a second calibration instruction that includes the characteristic to the second electronic control unit, wherein the second electronic control unit is configured to adjust a calibration of the second electronic control unit based upon the second calibration instruction.

16. The vehicle of claim 1, wherein the characteristic of the performance product includes at least one of a a manufacturer and a model number of the performance product.

17. The vehicle of claim 1, wherein the receiver is further configured to receive a wireless signal from a transducer of a second performance product, the wireless signal including a characteristic of the second performance product, the characteristic being a product type of the second performance product, wherein the product type of the performance product is different than the product type of the second performance product, and wherein the product controller is further configured to:
determine, based upon the characteristic included in the wireless signal, that the second performance product is authenticated to be installed on the vehicle;
determine that the second performance product affects performance of the electronic control unit of the vehicle based upon the characteristic of the second performance product; and
send, based on the determination that the second performance product is authenticated to be installed on the vehicle and the determination that the second performance product affects the electronic control unit, a calibration instruction that includes the characteristic to an electronic control unit.

18. A method for calibrating a vehicle, comprising:
receiving, via a receiver of the vehicle, a wireless signal from a transducer of a performance product, the wireless signal including a characteristic and the product type of the performance product and a product type of the performance product;
determining, based upon the characteristic and the product type included in the wireless signal, that the performance product is authenticated to be installed on the vehicle;
determining that the performance product affects performance of an electronic control unit based upon the characteristic and the product type of the performance product
sending, based on the determination that the performance product is authenticated to be installed on the vehicle and the determination that the performance product affects the performance of the electronic control unit, to the electronic control unit a calibration instruction to perform a calibration of the electronic control unit based on the characteristic and the product type; and
adjusting a calibration of the electronic control unit to a target setting based upon the characteristic and the product type.

19. The method of claim 18, further comprising:
checking, via a processor and prior to sending the calibration instruction to the electronic control unit, for updated software for the electronic control unit based upon the characteristic of the performance product.

20. The method of claim 18, further comprising:
adjusting the calibration of the electronic control unit to the target setting based upon a current setting of the setting.

* * * * *